United States Patent [19]

Swilley

[11] Patent Number: 4,653,149

[45] Date of Patent: Mar. 31, 1987

[54] ANIMAL HIDE PULLER

[75] Inventor: Wilson H. Swilley, Persia, Iowa

[73] Assignee: The Cincinnati Butchers' Supply Company, Cincinnati, Ohio

[21] Appl. No.: 817,400

[22] Filed: Jan. 9, 1986

[51] Int. Cl.⁴ .............................................. A22B 5/16
[52] U.S. Cl. ...................................................... 17/21
[58] Field of Search ........................................... 17/21

[56] References Cited

U.S. PATENT DOCUMENTS

| 3,129,454 | 4/1964 | Johnson | 17/21 |
| 3,364,516 | 1/1968 | White | 17/21 |
| 4,127,917 | 12/1978 | Pohio et al. | 17/21 |
| 4,229,860 | 10/1980 | Irwin | 17/21 X |
| 4,392,274 | 7/1983 | Nory | 17/21 |

FOREIGN PATENT DOCUMENTS 2829882  1/1980  Fed. Rep. of Germany .......... 17/21

OTHER PUBLICATIONS

Mitab Hide Puller publication—relates to a hide-pulling machine utilizing a cantileverly supported hide drum that swings about a pivot.
The Hamjern 35 publication—relates to a cattle stripper having a cantileverly supported hide-pulling drum.

Primary Examiner—Willie G. Abercrombie
Attorney, Agent, or Firm—Lloyd L. Zickert

[57] ABSTRACT

An animal hide puller for use in a slaughtering process to remove the hide from an animal carcass, including a rotatable and vertically movable hide drum coacting with an overhead track from which an animal is supported and a stanchion for fixing the position of the forelegs. The drum is vertically driven along an arcuate path commensurate with approximate contour of the back of the animal.

8 Claims, 8 Drawing Figures

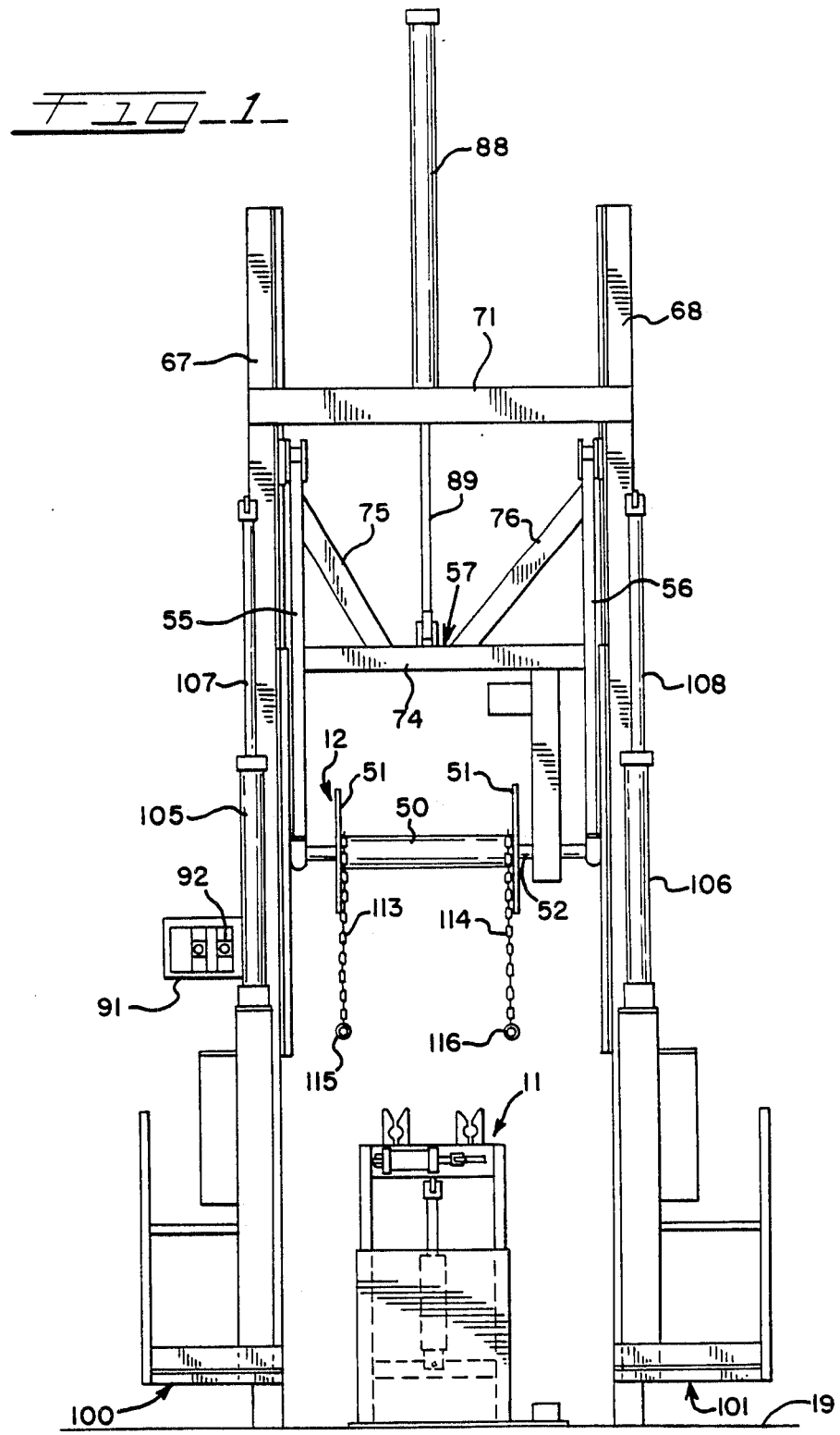

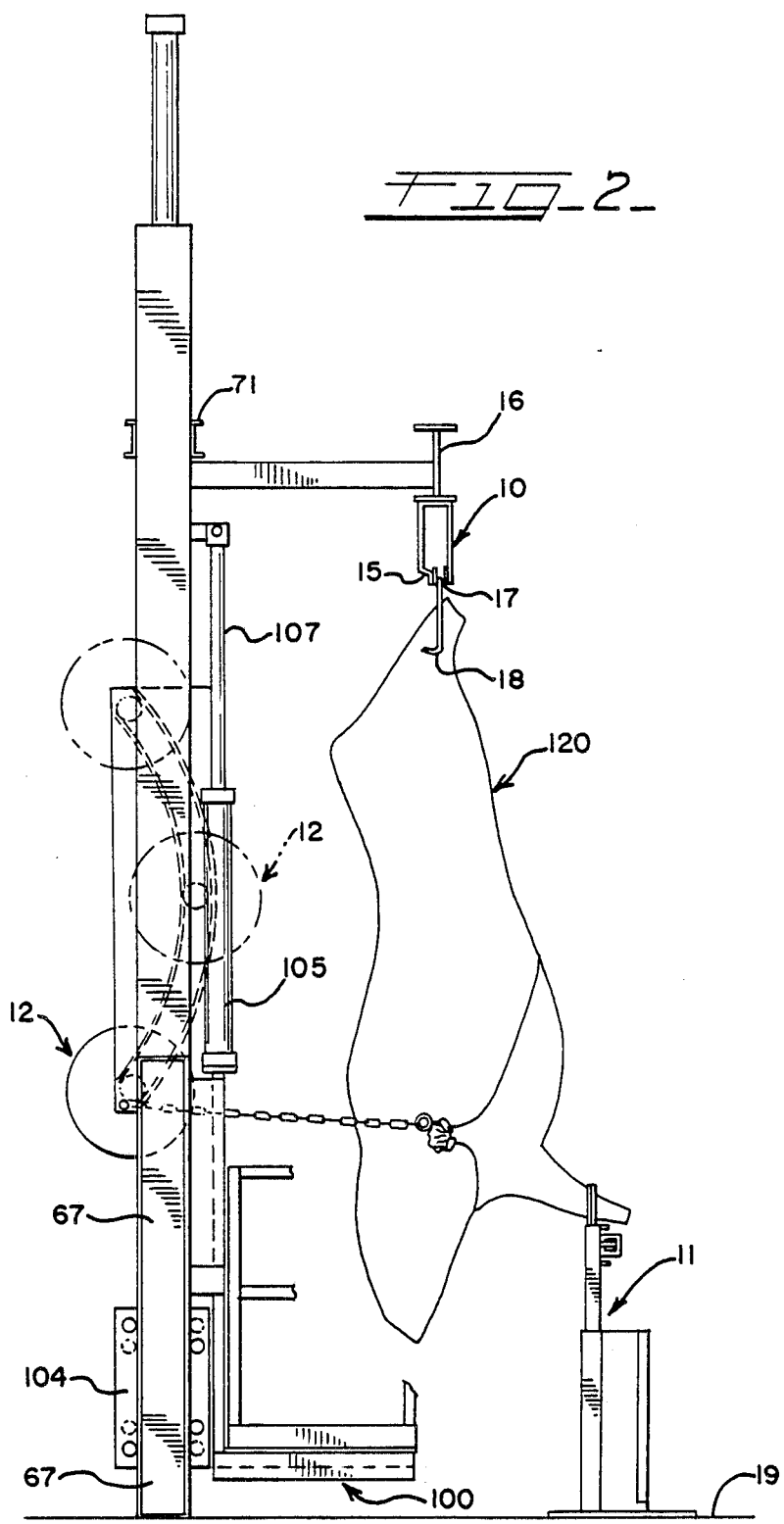

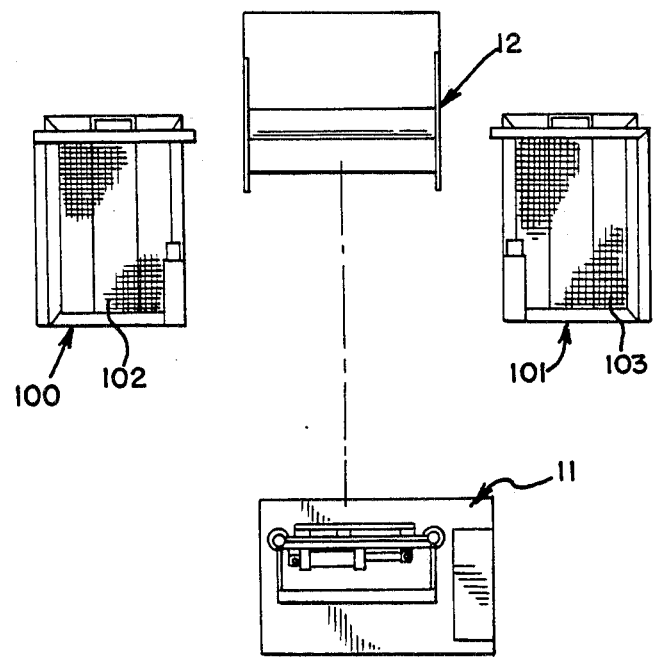
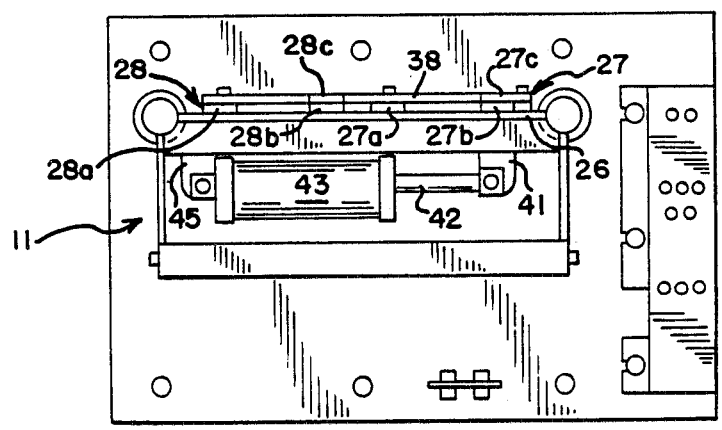

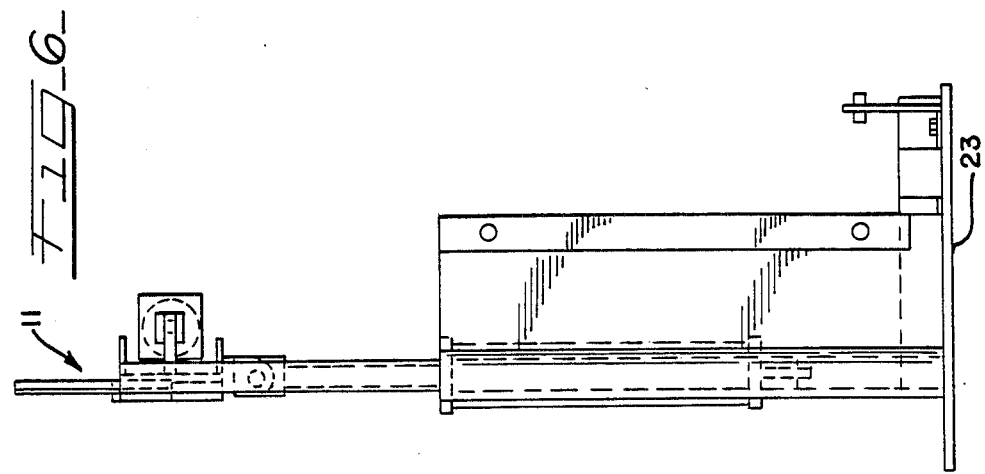
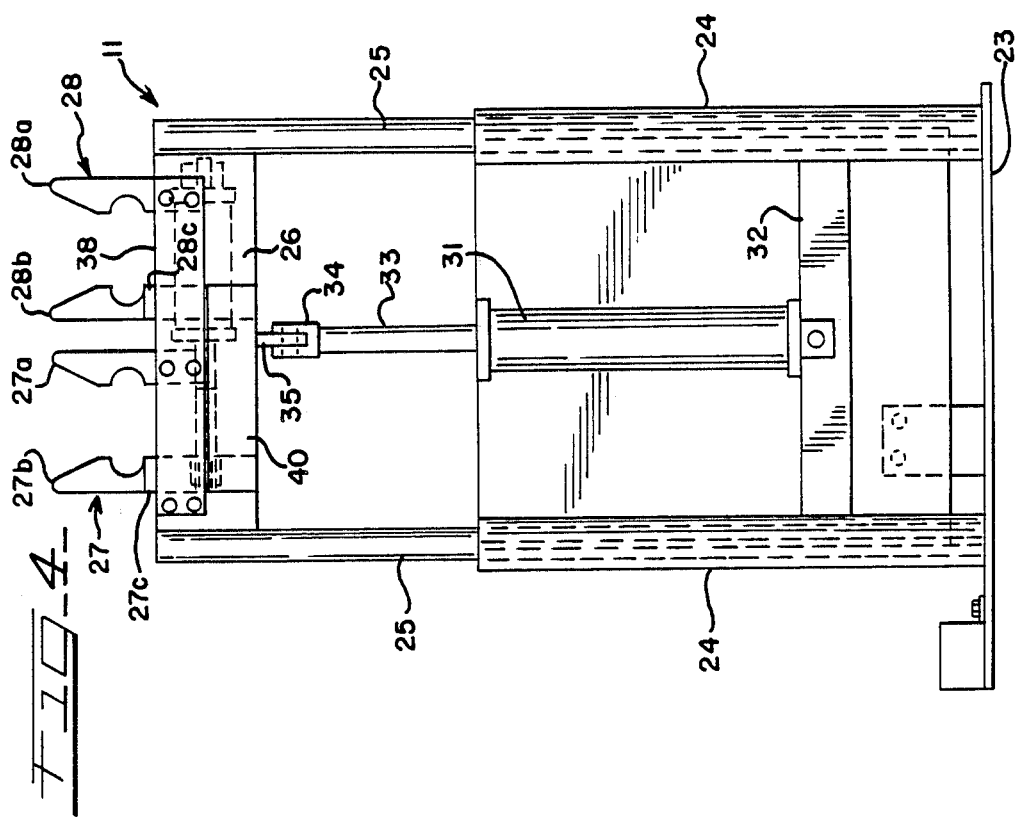

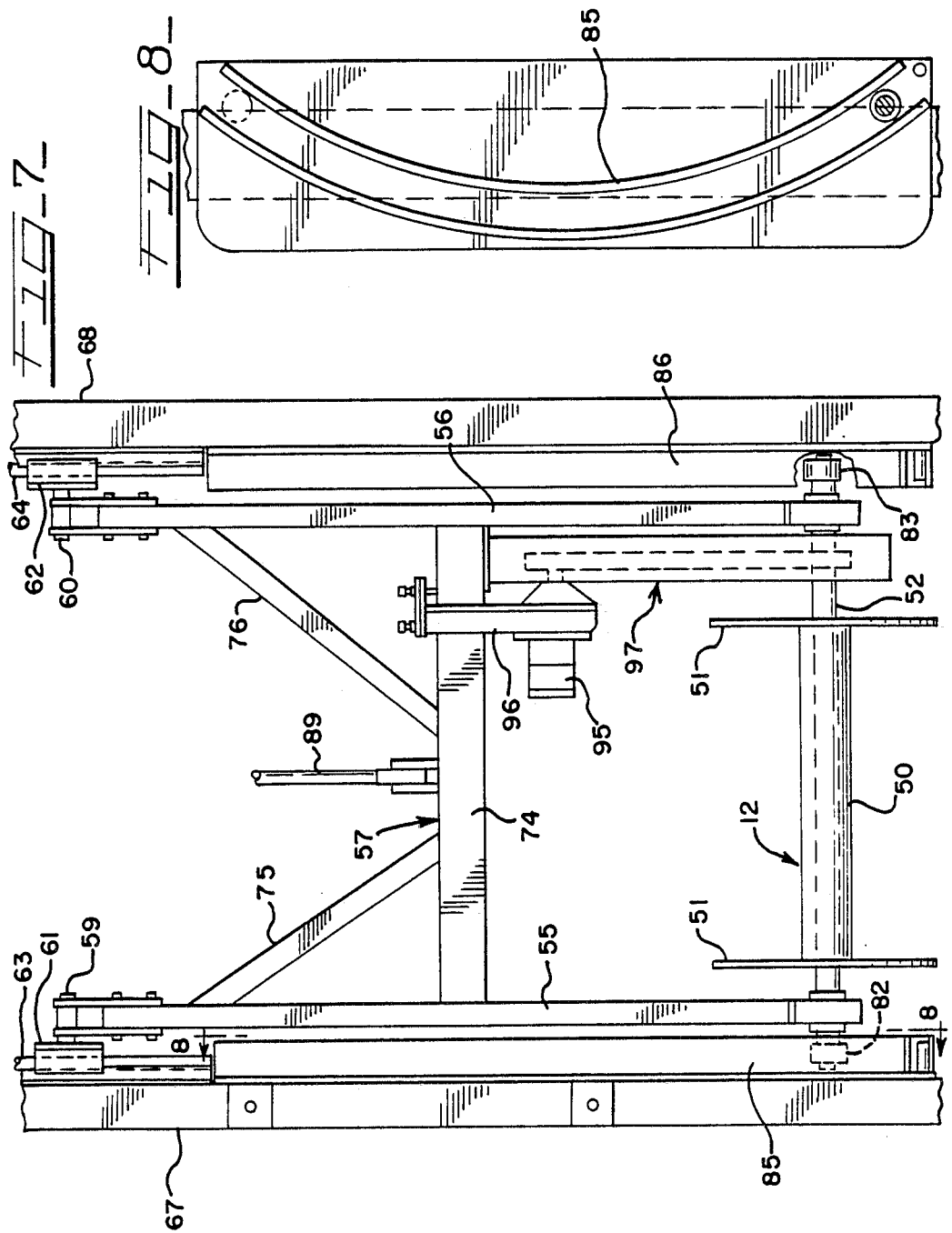

ANIMAL HIDE PULLER

DESCRIPTION

This invention relates in general to an animal hide puller for quickly and cleanly stripping the hide from an animal carcass in a slaughterhouse that can be easily incorporated in an existing slaughtering process or designed into a new process, and still more particularly to a new and improved hide pulling apparatus for removing hide from animal carcasses.

BACKGROUND OF THE INVENTION

Heretofore, machines for removing or stripping hide from animal carcasses for use in a meat-packing plant during the slaughtering process have been known. Such machines include a cantileverly mounted hide pulling drum that pivotally swings along a carcass hanging from its hind quarters and having the forelegs connected to chains during the hide-stripping operation. These machines, because of the cantileverly supported drum, must be heavily built and also require a considerable amount of floor area. They also require suspending the carcass at a sufficient distance from the machine so as to prevent interference between the movable parts of the machine and the carcass during the stripping operation.

SUMMARY OF THE INVENTION

The present invention overcomes the difficulties heretofore encountered and particularly provides a machine that can be mounted in a compact area and which requires a minimum amount of floor area in order to design the use of the machine in a slaughtering process. The present invention further enables the more efficient stripping of hide from an animal carcass in providing a drum on which the hide is rotatably wound during the stripping operation that is movable generally vertically along a defined arcuate path approximating the curvature of the back of the animal. A stanchion is provided for quickly and easily securing the forelegs of the carcass at the drum.

The compactness of the hide puller machine of the present invention facilitates the installation of the machine in a small area so that the machine can be easily fitted into existing meat-processing lines and also be easily designed into new installations.

It is therefore an object of the present invention to provide a new and improved hide-pulling machine for meat-packing plants.

A further object of the present invention is in the provision of a new and improved hide-pulling machine that is compact and takes up a minimum amount of floor area while still maintaining the ability to quickly and efficiently strip a hide from an animal carcass.

A still further object of the present invention is in the provision of a hide-pulling machine that may be easily and simply installed in an existing meat-processing line and also easily designed into a new meat-processing line.

Another object of the present invention is in the provision of a new and improved hide-pulling machine to be used in combination with an overhead track for supporting and conveying animal carcasses and which includes a stanchion for quickly fixing the position of the forelegs of the carcass and a vertically driven hide-pulling drum that is rotatably driven to wind up the hide and vertically driven up along the body of the animal.

Other objects, features and advantages of the invention will be apparent from the following detailed disclosure, taken in conjunction with the accompanying sheets of drawings, wherein like reference numerals refer to like parts, in which:

BRIEF DESCRIPTION OF THE DRAWINGS

FIG. 1 is a front elevational view of the hide-pulling machine of the present invention;

FIG. 2 is a side elevational view of the hide-pulling machine of the present invention and schematically illustrating the position of an animal carcass with its hide connected to the hide drum of the present invention and ready for the hide-pulling operation;

FIG. 3 is a top plan view of the hide-pulling machine of the present invention;

FIG. 4 is an enlarged rear elevational view of the stanchion for fixing the position of the forelegs or shanks of the carcass during the hide-stripping operation;

FIG. 5 is a plan view of the stanchion;

FIG. 6 is an end elevation view of the stanchion;

FIG. 7 is a greatly enlarged front elevational view of the hide-pulling drum carriage and related parts; and FIG. 8 is a vertical elevational view taken of one of the guide tracks for the hide drum and taken generally along line 8—8 of FIG. 7.

DESCRIPTION OF THE INVENTION

The hide-pulling machine of the present invention is particularly useful for removing hide from cattle carcasses in the slaughtering process at a meat-packing plant. The machine may be designed into an existing meat-processing line or into a meat-processing line for a new meat-packing plant. That the machine requires a minimal floor area enhances the ease within which it may be incorporated into an existing plant. Preferably, it is installed in relation to an overhead conveyer so that the hide can be removed in sequential relation to other slaughtering steps where the carcass is conveyed to the machine on the overhead conveyor and following removal of the hide conveyed to the next station for further processing. However, it should be appreciated that the machine could be installed at a location away from an overhead conveyer and where suitable means is employed to transfer the animal carcass from a prior meat-processing station to the hide puller.

As with prior known hide pullers, the animal carcass is suspended from its hind legs with its head end down which disposes the longitudinal axis of the carcass generally along the vertical. The forelegs or shanks are anchored to a floor-mounted stanchion whereby the animal carcass is then supported from its hind legs and held against the hide-pulling forces by the stanchion. The stanchion includes clamping jaws for quickly and easily securing the forelegs in position. Since the stanchion is mounted on the floor and secured to the floor, it is only necessary when the animal is positioned in alignment with the stanchion to operate the clamping jaws to lock the forelegs to the stanchion so that the carcass is then ready for the hide-pulling operation.

A mechanism for effecting the stripping of the hide from the carcass, once it is in fixed position, includes a hide drum that is rotatably driven and also vertically driven along an arcuate path that approximates the curvature of the back of the animal carcass. It will therefore be appreciated that the back of the animal carcass faces the hide drum. Chains of the usual type are carried by the hide drum with an end eyelet permitting the fashioning of a choke that is connected to hide elements which have been preskinned in the area of the forelegs. The drum is rotated to wind the chain thereon and ultimately wind on the hide as it is removed from the carcass. The drum is also moved vertically as needed during the hide stripping operation and from a location approximately opposite the shoulders of the carcass to a point approximately opposite the hind quarters of the carcass.

In order to assist in the stripping operation, platforms are provided at opposite sides of the carcass for persons assisting the stripping operation, and which are vertically movable during the hide-pulling operation as the hide is stripped from the lower end of the carcass upwardly to the upper end of the carcass. The hide drum is mounted on a carriage that is vertically movable to lift the drum as it winds up the hide and to keep the drum at or just ahead of the area where the hide is being actively removed from the carcass. Manual controls are provided for one of the persons assisting in the hide-pulling operation at one of the movable platforms. Once the hide is stripped from the carcass, it can thereafter be removed from the hide drum and the drum then positioned for the next hide-pulling operation. Also, the carcass can be released from the stanchion and the moved to another station for further processing.

Referring now to the drawings, and particularly to FIGS. 1 and 2, the hide-pulling machine of the present invention, arranged in relation to an overhead support in the form of an overhead conveyer 10 for supporting an animal carcass from its hind quarters, includes generally a floor mounted stanchion 11 that secures in position the lower end of the animal carcass by connecting to the forelegs or shanks, and a rotatably driven and vertically movable hide-pulling drum 12.

The overhead conveyer 10 includes a track 15 suitably supported from an overhead supporting beam 16 that may be suitably tied into the building or columns in the building or otherwise floor supported. Trolleys 17 are movable along the track 15 from which are suspended suitable meat hooks 18 or the like on which a hind leg of an animal carcass would be hung. As illustrated, the track extends parallel to the longitudinal axis of the drum 12. While not shown, it may be appreciated that a meat hook may be provided for each hind leg or quarter on separated trolleys or on a trolley conveyance that included a pair of meat hooks so that the hind legs would be spaced apart a suitable distance for the meat-processing operation.

As particularly shown in FIG. 2, the animal carcass then would be supported from the overhead conveyer with its head end down so that the back of the animal would be facing the hide drum 12. The stanchion is also parallel to the drum. As seen particularly in FIG. 1, the stanchion 11 is mounted on the floor 19 and suitably secured thereto and in alignment with the hide-pulling drum 12. When the animal carcass is conveyed into position in alignment with the stanchion 11 and the hide-pulling drum 12, the forelegs of the carcass can then be clamped to the stanchion.

Referring now particularly to FIGS. 4, 5 and 6, the stanchion 11 includes a base plate 23 and upstanding therefrom in parallel spaced relation a pair of tubular guides 24 telescopically and slidably receiving a pair of cylindrical posts 25. Secured between the upper ends of the posts is a transversely extending connecting bar 26 on which clamps 27 and 28 are mounted. The height of the clamp supporting bar 26 is adjusted as needed to properly clamp the forelegs of the carcass by a pneumatic cylinder 31 fixed at its lower end to a cross brace 32 extending between the tubular guides 24 and having a piston rod 33 with a clevis 34 connected to a lug 35 extending from the clamp supporting bar 26. Thus, operation of the pneumatic cylinder 31 selectively raises and lowers the clamps 27 and 28 to the level desired as needed depending on the size of the animal carcass.

Clamps 27 and 28 include fixed clamp jaws 27a and 28a respectively that are suitably fixed to the bar 26 and movable or sliding clamp jaws 27b and 28b that are movably mounted relative to the fixed jaws to selectively close and open the clamps.

As seen particularly in FIGS. 4 and 5, fixed clamp jaws 27a and 28a are connected to a bar 38 that is fixed to the crossbar 26. Movable clamp jaws 27b and 28b are disposed between connecting bar 26 and bar 38 and are provided with guide lugs 27c and 28c that ride on the upper edge of fixed bar 38. Further, the clamp jaws are connected at their lower ends to a link 40 so that they move together. The link 40 is in turn connected to an arm 41 that is pivotally connected to the outer end of a piston rod 42 of pneumatic cylinder 43. The cylinder is in turn connected to a fixed arm 45 extending from the cross connecting bar 26. Thus, operation of the pneumatic cylinder 43 causes closing and opening of the clamps 27 and 28 by movement of the sliding clamps 27b and 28b. As seen particularly in FIG. 4, the opposed clamp faces have cutouts for facilitating the gripping of the forelegs of an animal carcass.

The hide-pulling drum 12 includes a cylindrically formed core or winding member 50 with spaced parallel extending disk flanges 51 all mounted on and corotatable with a supporting shaft 52. As seen in FIGS. 1 and 7, the opposite ends of the shaft are bearingly mounted at the lower ends of elongated carriage arms 55 and 56 of the hide-pulling drum carriage 57. The upper ends of the arms 55 and 56 are pivotally mounted to stub shafts 59 and 60 extending from slide blocks 61 and 62 that are in turn slidably received on tracks 63 and 64. The tracks 63 and 64 are in turn mounted on vertically upstanding columns or posts 67 and 68 secured at their lower ends and supported by the floor 19. As seen in FIGS. 1 and 2, the upper ends of the columns 67 and 68 are interconnected by cross bracing 71. Additionally, the columns may be otherwise suitably supported at their upper ends in a suitable manner either to the building or other floor-mounted structures.

The carriage 57 is provided with a cross brace 74 between the carriage arms 55 and 56, and diagonally extending braces 75 and 76 extend between the cross brace 74 and the arms 55 and 56. While the tracks 63 and 64 extend parallel to and linearly along the vertical posts 67 and 68 so that the slide blocks 61 and 62 move along a linear path when the carriage is raised and lowered, the lower ends of the arms 55 and 56 to which the hide-pulling drum 12 is rotatably mounted move along an arcuate path by means of guide rollers 82 and 83 rotatably carried on opposite ends of the supporting shaft 52 and guidably received in opposed arcuate tracks 85 and 86 respectively. As seen particularly in FIGS. 7 and 8, the tracks 85 and 86 are suitably secured to the opposed upstanding posts 67 and 68 and the arcuate configuration of the tracks generally conforms to the arcuate configuration of the back of an animal carcass so that as the hide-pulling drum moves upwardly along the carcass, it moves along a path generally conforming to the back of the carcass, so that the drum is about the same distance from the carcass at all times.

As seen particularly in FIG. 1, a hydraulic cylinder 88 having a piston rod 89 functions to drive the hide-pulling drum vertically. The cylinder is secured to the cross brace 71, while the free end of the piston rod is pivotally secured to the carriage 57 at the cross brace 74. A control panel 91 extends from the post 67 at a suitable height and includes a control lever 92 for operating the hydraulic cylinder 88.

The drum 12 is rotatably driven by a rotatable hydraulic motor 95 mounted on a support 96 extending downwardly from the carriage cross brace 74 and through a drive transmission that includes a suitable sprocket on the output shaft of the motor 95. Chain connected to a suitable sprocket on the drum shaft 52 rotatably drives the drum. The drive transmission between the motor 95 and the shaft 52 is generally designated by the numeral 97.

In order to assist in the stripping of the hide from the carcass, vertically movable platforms 100 and 101 are disposed at opposite sides of where the animal carcass is positioned during the hide-pulling operation. These platforms includes respectively floors 102 and 103 on which a person would stand and follow the hide-pulling drum as it moves vertically upward during the hide-pulling operation. Additionally, as seen in FIG. 2, each platform is provided with guide means 104 that coacts with the adjacent post so that the movement of the platform is guided along the post during its vertical movement. Individual controls not shown would be provided on the platform structures for operation of the persons concerned with assisting in the hide pulling operation. Each platform has suitably mounted thereto a pneumatic cylinder 105 and 106 respectively for driving the platform vertically along its each respective post. Each cylinder includes a piston rod 107 and 108 respectively that in turn has its free end secured to the adjacent post. Thus, operation of the pneumatic cylinders will effect vertical movement of the platforms.

In order to connect the hide to the hide-pulling drum 12, a pair of chains 113 and 114 have one end connected to the drum and are provided at the other ends with eyes 115 and 116 respectively so that a chokehold can be applied to skin elements on the opposite sides of the carcass, thereby facilitating the connection of chains to the hide.

In operation, an animal carcass such as illustrated in FIG. 2 and generally designated by the numeral 120, is conveyed into position with the machine whereby it is aligned with the hide-pulling drum 112 and the stanchion 11. The height of the stanchion is checked by an operator and adjusted if necessary to place the clamps in the best position for securing the forelegs. Likewise, the drum is suitably positioned. The forelegs are then clamped to the stanchion and the chains 113 and 114 are connected to hide portions at opposite sides of the animal carcass which have been preskinned and as illustrated in FIG. 2. Operators are stationed on the platforms and the hide-pulling operation is then started. The drum 12 is of course at this point in its lower position, as seen in FIG. 2. It is actuated to wind the chain onto the drum and also to wind the hide onto the drum and, as the stripping operation commences, to continue winding the hide onto the drum and to be moved vertically up the animal carcass. At the same time, the persons assisting in the stripping operation will operate their platforms to move vertically upwards and where needed provide skinning with suitable skinning tools until the hide is completely removed. At this point, the drum 12 is in its upper position, as shown in FIG. 2. Thereafter, the carcass can be released from the stanchion and conveyed to the next meat-processing station and the hide can be removed from the drum and repositioned along with the platforms in their lowermost position for the next hide-pulling operation.

It will be understood that modifications and variations may be effected without departing from the scope of the novel concepts of the present invention, but it is understood that this application is to be limited only by the scope of the appended claims.

I claim:

1. A hide-pulling machine for removing hide from an animal carcass suspended generally vertically from its hind quarters with the back facing said machine, wherein the carcass has preloosened hide portions adjacent its forelegs, said machine comprising floor mounted means for restraining the forelegs of the carcass, a hide-pulling drum disposed in facing relation to the back of the animal carcass, opposed vertically extending tracks mounting the drum for substantially vertical movement between a lowermost position to an uppermost position, said drum having means for connection to said preloosened hide portions, means for driving said drum along said tracks, means for rotating said drum as it is being driven vertically to wind the hide onto the drum as it is being removed from the carcass, and means for maintaining the spacing between the drum and carcass back substantially constant during vertical movement of the drum including arcuate track sections guiding said drum along an arcuate path complementary to the curvature of the carcass back.

2. The hide-pulling machine defined in claim 1, which further includes a pair of vertically movable platforms one disposed at each side of the area where the animal carcass is suspended during the hide pulling operation, each platform being adapted to vertically carry a person who can assist in the hide-pulling operation as the drum is driven vertically, and manually operable means for selectively driving each of the platforms.

3. The combination as defined in claim 2, wherein said means for driving said platform means includes individual pneumatic cylinders.

4. The hide-pulling machine defined in claim 2, wherein said means for restraining the forelegs includes a stationary stanchion secured to the floor.

5. The combination as defined in claim 4, wherein said stanchion includes a pair of clamping members one for each foreleg of the carcass and means for power operating said clamping members.

6. The combination as defined in claim 4, wherein said stanchion further includes means for adjusting the height of said clamping members.

7. The combination as defined in claim 6, wherein said adjusting means includes a pneumatic cylinder.

8. The combination as defined in claim 7, wherein said means for power operating said clamping members includes a pneumatic cylinder.

* * * * *